United States Patent
Sareen et al.

(10) Patent No.: US 9,497,521 B2
(45) Date of Patent: Nov. 15, 2016

(54) OPPORTUNITY BASED PATH COMPUTATION SYSTEMS AND METHODS IN CONSTRAINT-BASED ROUTING

(71) Applicants: Jatin Sareen, New Delhi (IN); Kapil Juneja, Gurgaon (IN); Rajagopalan Kannan, Gurgaon (IN)

(72) Inventors: Jatin Sareen, New Delhi (IN); Kapil Juneja, Gurgaon (IN); Rajagopalan Kannan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 422 days.

(21) Appl. No.: 14/301,397

(22) Filed: Jun. 11, 2014

(65) Prior Publication Data
US 2016/0234578 A1 Aug. 11, 2016

(30) Foreign Application Priority Data
Apr. 30, 2014 (IN) ............ 1167/DEL/2014

(51) Int. Cl.
*H04Q 11/00* (2006.01)
*H04L 12/721* (2013.01)
*H04L 12/723* (2013.01)
*H04L 12/751* (2013.01)

(52) U.S. Cl.
CPC ......... *H04Q 11/0062* (2013.01); *H04L 45/124* (2013.01); *H04L 45/02* (2013.01); *H04L 45/50* (2013.01); *H04Q 2011/009* (2013.01); *H04Q 2011/0077* (2013.01)

(58) Field of Classification Search
CPC ..... H04L 45/124; H04L 45/50; H04L 45/02; H04Q 11/0062; H04Q 2011/009; H04Q 2011/0077; H04Q 11/0005; H04Q 2011/0039; H04Q 2011/0052; H04Q 2011/0015
See application file for complete search history.

(56) References Cited

U.S. PATENT DOCUMENTS

| | | | |
|---|---|---|---|
| 6,996,342 B2 | 2/2006 | Park et al. | |
| 7,995,461 B2 | 8/2011 | Vasseur et al. | |
| 8,224,948 B2 | 7/2012 | Liu | |
| 8,363,562 B2 | 1/2013 | Liu et al. | |
| 8,442,030 B2 | 5/2013 | Dennison | |
| 8,619,553 B2 | 12/2013 | Madrahalli et al. | |
| 8,682,160 B2 | 3/2014 | Prakash et al. | |
| 2003/0117950 A1* | 6/2003 | Huang | H04L 45/00 370/220 |
| 2009/0296719 A1* | 12/2009 | Maier | H04L 45/12 370/400 |
| 2013/0259465 A1 | 10/2013 | Blair | |
| 2014/0126899 A1 | 5/2014 | Prakash et al. | |
| 2015/0295772 A1* | 10/2015 | Bouda | H04L 41/12 398/115 |

FOREIGN PATENT DOCUMENTS

CN 103619047 A 3/2014

* cited by examiner

*Primary Examiner* — Ted Wang
(74) *Attorney, Agent, or Firm* — Clements Bernard PLLC; Christopher L. Bernard; Lawrence A. Baratta, Jr.

(57) ABSTRACT

A method, a controller, and a network include determining an opportunity cost metric for each of a plurality of links in a network including a plurality of nodes, wherein the opportunity cost metric comprises a future constraint reflecting expectations for growth on currently established connections on each link of the plurality of links; receiving a request for a new connection between two nodes of the plurality of nodes in the network; and utilizing a constraint-based routing algorithm to determine a path for the new connection between the two nodes, wherein the constraint-based routing algorithm determines the path through the plurality of nodes via the plurality of links based on a plurality of constraints including the opportunity cost metric.

20 Claims, 6 Drawing Sheets

OPPORTUNITY BASED PATH COMPUTATION SYSTEMS AND METHODS IN CONSTRAINT-BASED ROUTING

FIELD OF THE DISCLOSURE

The present disclosure relates generally to networking systems and methods. More particularly, the present disclosure relates to opportunity-based path computation systems and methods in constraint-based routing.

BACKGROUND OF THE DISCLOSURE

In networks and the like, control planes provide automatic allocation of network resources in an end-to-end manner. Exemplary control planes may include Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at one or more layers, and establishing connections there between. As described herein, these control planes may be referred to as control planes as they deal with routing signals at Layers 1 and 2, i.e., time division multiplexing (TDM) signals such as, for example, Synchronous Optical Network (SONET), Synchronous Digital Hierarchy (SDH), Optical Transport Network (OTN), Ethernet, MPLS, and the like. Control planes are configured to establish end-to-end signaled such as sub-network connections (SNCs) in ASON or OSRP and label switched paths (LSPs) in GMPLS and MPLS. All control planes use the available paths to route the services and program the underlying hardware.

Control planes generally support two type of automated provisioning mechanisms for determining a route for connection establishment: 1) route information is explicitly specified by an operator; or 2) an optimal route computation is automatically performed by control plane, using a constraint-based routing algorithm. Conventionally, constraint-based routing algorithms determine a path in a network based on several constraints such as available bandwidth, color (optical virtual private network number), delay, administrative weights, priority, fragmentation, etc. Specifically, conventional constraint-based routing algorithms only account for current attributes in decision making and do not account for parameters like future bandwidth demand for expanding a connection while making decision for route selection. This creates inefficient decisions over time by not accounting for future capability of links. For example, an issue can arise where some connection that needed an opportunity may not be able to find path, because some other connection has already taken its resources, when that other connection had alternative options available. Since that other connection made choices based current constraints, even when that connection could have chosen an alternate path, it may exhaust the future opportunity that a path was offering for other connections that needed it. There is a so-called lost opportunity here.

Specifically, conventional techniques have various shortcomings. In case some links have more capability with respect to type of connections/bandwidth they can support, and since conventional techniques do not use this as a constraint in route computation, one may end up exhausting all the links that support those capability for other type of connections. This may leave some connections starving for bandwidth, because links that were capable of those bandwidth types were consumed by connections that could had been allocated to lesser capable links. Since conventional techniques are based on current resource constraints and do not account for future opportunity that some connections (e.g., flex-based, Layer 2/3, etc.) may demand for dynamic growth of bandwidth. This may restrict hitless dynamic growth of connections, because the bandwidth was consumed by connections that could have been allocated to links not offering such opportunity.

BRIEF SUMMARY OF THE DISCLOSURE

In an exemplary embodiment, a method includes determining an opportunity cost metric for each of a plurality of links in a network including a plurality of nodes, wherein the opportunity cost metric includes a future constraint reflecting expectations for growth on currently established connections on each link of the plurality of links; receiving a request for a new connection between two nodes of the plurality of nodes in the network; and utilizing a constraint-based routing algorithm to determine a path for the new connection between the two nodes, wherein the constraint-based routing algorithm determines the path through the plurality of nodes via the plurality of links based on a plurality of constraints including the opportunity cost metric. The opportunity cost metric can include a flag identifying a presence or absence of expandable connections of the currently established connections on each link of the plurality of links. The opportunity cost metric can be based on a presence or absence of flexible Optical channel Data Unit (ODU) connections on each link of the plurality of links. The opportunity cost metric can include a numerical value identifying an amount of expandable connections for the currently established connections on each link of the plurality of links. The numerical value can be based on a Committed Information Rate (CIR)/Committed Burst Size (CBS) and an Excess Information Rate (EIR)/Excess Burst Size (EBS) for the currently established connections on each link of the plurality of links.

The opportunity cost metric can be defined for each of a plurality of bandwidth chunks on each link of the plurality of links. The opportunity cost metric can be defined for a capability of adding any of a plurality of bandwidth chunks on each link of the plurality of links. The method can further biasing the constraint-based routing algorithm to select links of the plurality of links based on a lower opportunity cost metric than other links of the plurality of links. The method can further, for links of the plurality of links that comply with a maximum delay constraint, selecting the links based on the opportunity cost metric. The method can further publishing and maintaining the opportunity cost metric for each of the plurality of links via control plane signaling in the network. The constraint-based routing algorithm can include any of Constrained Shortest Path First (CSPF), Constraint-based Routing Label Distribution Protocol (CR-LDP), Resource Reservation Protocol-Traffic Engineering (RSVP-TE), Private Network-to-Network Interface (PNNI), Open Shortest Path First (OSPF), OSPF-Traffic Engineering (OSPF-TE), and Intermediate System to Intermediate System (IS-IS).

In another exemplary embodiment, a controller includes a network interface communicatively coupled to one or more nodes of a plurality of nodes in a network; a processor communicatively coupled to the network interface; and memory storing instructions that, when executed, cause the processor to: receive or determine an opportunity cost metric for each of a plurality of links interconnecting the plurality of nodes, wherein the opportunity cost metric includes a future constraint reflecting expectations for growth on currently established connections on each link of the plurality of links; receive a request for a new connection between two nodes of the plurality of nodes in the network; and utilize a constraint-based routing algorithm to determine a path for the new connection between the two nodes, wherein the constraint-based routing algorithm determines the path through the plurality of nodes via the plurality of links based on a plurality of constraints including the opportunity cost metric. The opportunity cost metric can include a flag identifying a presence or absence of expandable connections of the currently established connections on each link of the plurality of links; and the opportunity cost metric can be based on a presence or absence of flexible Optical channel Data Unit (ODU) connections on each link of the plurality of links.

The opportunity cost metric can include a numerical value identifying an amount of expandable connections for the currently established connections on each link of the plurality of links; and the numerical value can be based on a Committed Information Rate (CIR)/Committed Burst Size (CBS) and an Excess Information Rate (EIR)/Excess Burst Size (EBS) for the currently established connections on each link of the plurality of links. The opportunity cost metric can be one of defined for each of a plurality of bandwidth chunks on each link of the plurality of links and defined for a capability of adding any of a plurality of bandwidth chunks on each link of the plurality of links. The instructions that, when executed, can further cause the processor to: bias the constraint-based routing algorithm to select links of the plurality of links based on a lower opportunity cost metric than other links of the plurality of links. The instructions that, when executed, can further cause the processor to: for links of the plurality of links that comply with a maximum delay constraint, select the links based on the opportunity cost metric. The instructions that, when executed, can further cause the processor to: maintain the opportunity cost metric for each of the plurality of links via control plane signaling in the network. The constraint-based routing algorithm can include any of Constrained Shortest Path First (CSPF), Constraint-based Routing Label Distribution Protocol (CR-LDP), Resource Reservation Protocol-Traffic Engineering (RSVP-TE), Private Network-to-Network Interface (PNNI), Open Shortest Path First (OSPF), OSPF-Traffic Engineering (OSPF-TE), and Intermediate System to Intermediate System (IS-IS).

In yet another exemplary embodiment, a network includes a plurality of nodes interconnected by a plurality of links; and a control plane operating in the network and utilizing a constraint-based routing algorithm; wherein the control plane is configured to: receive or determine an opportunity cost metric for each of the plurality of links, wherein the opportunity cost metric includes a future constraint reflecting expectations for growth on currently established connections on each link of the plurality of links; receive a request for a new connection between two nodes of the plurality of nodes in the network; and utilize the constraint-based routing algorithm to determine a path for the new connection between the two nodes, wherein the constraint-based routing algorithm determines the path through the plurality of nodes via the plurality of links based on a plurality of constraints including the opportunity cost metric.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, opportunity-based path computation systems and methods include modifying constraint-based routing algorithms to include an opportunity metric accounting for future opportunities on existing connections. By accounting for future opportunities, a constraint-based routing algorithm can select a path that offers a least amount of future opportunity in addition to other constraints, so existing connections with higher opportunities can be accommodated. In other words, the opportunity-based path computation systems and methods evaluate a cost metric associated with loss of future opportunity for each available path. The cost metric for opportunity generally conveys expectations related to existing connections on a link for their future expansion or for addition of new connections with diverse bandwidth in the remaining bandwidth available on the link. For example, available bandwidth is a current constraint reflecting the currently available bandwidth on a per link basis, and opportunity cost can similarly be a future constraint reflecting what the expectations are for growth on currently established connections on a per link basis. Opportunity cost can be derived and evaluated differently for different protocols as is described herein. The opportunity-based path computation systems and methods contemplate operation with any constraint-based routing algorithm as an additionally considered constraint.

Figure 1:
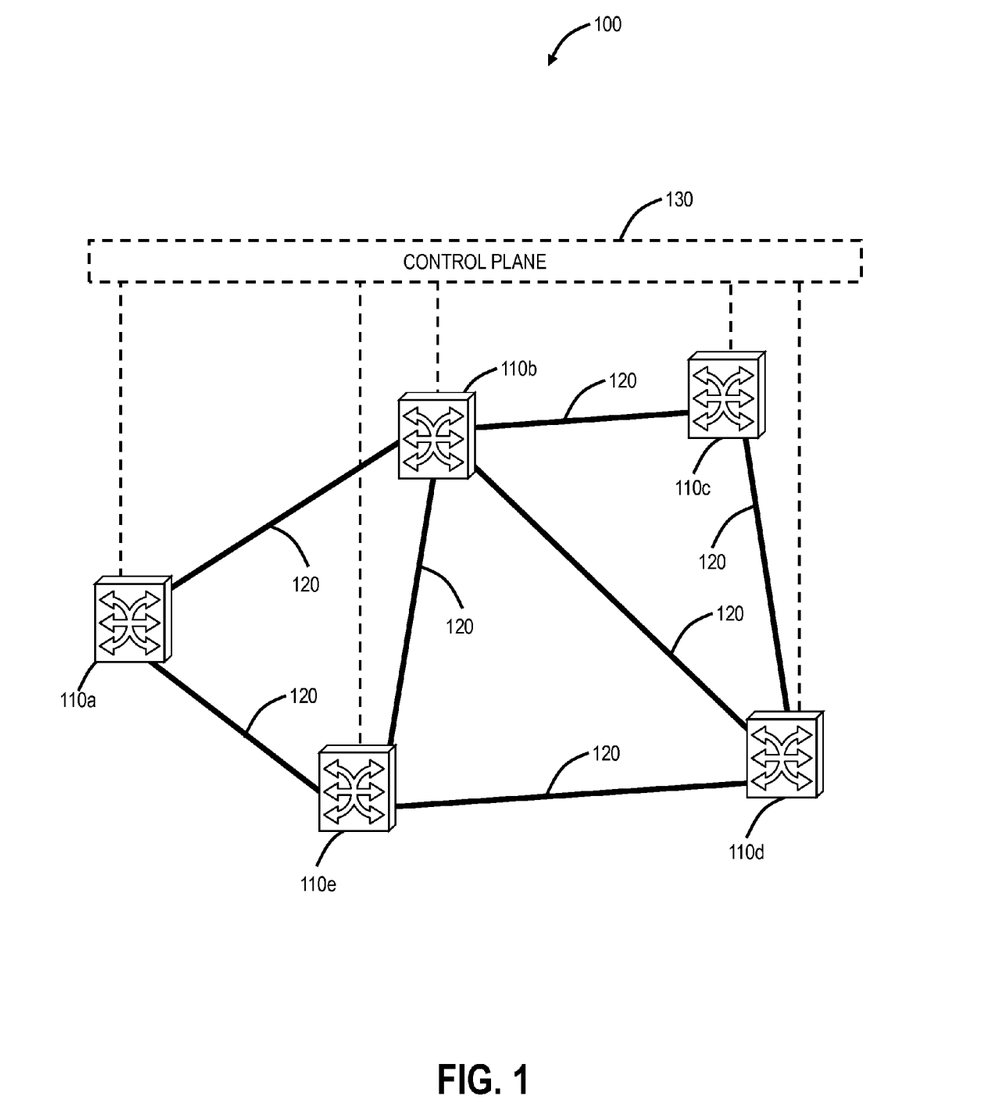
FIG. 1 is a network diagram of an exemplary network with five interconnected nodes.
Figure 2:
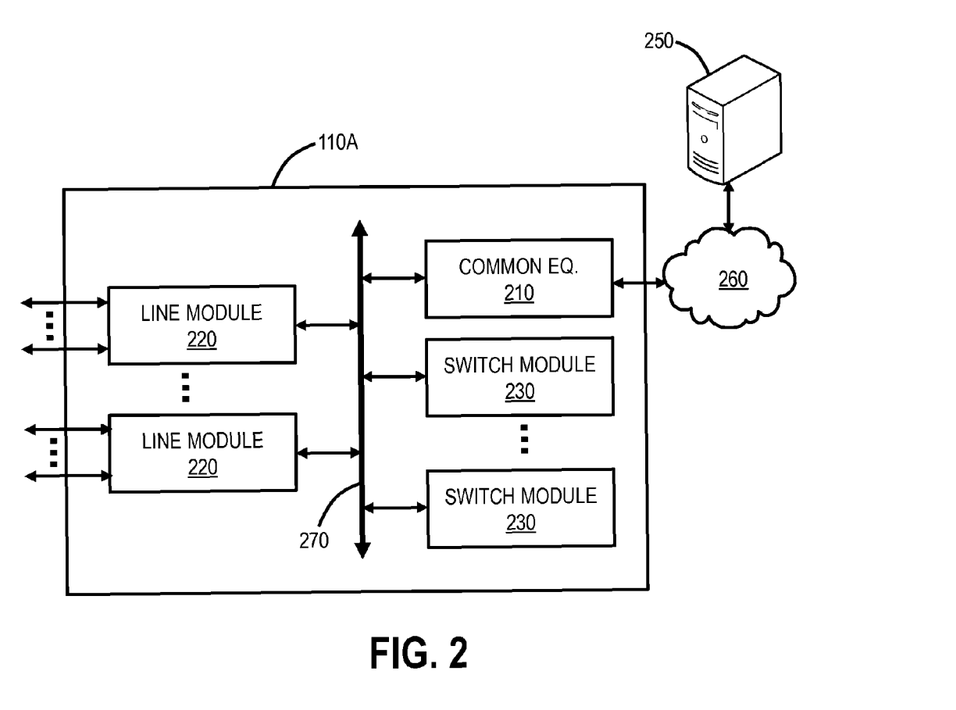
FIG. 2 is a block diagram of an exemplary node for use with the systems and methods described herein.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. The nodes 110 communicate with one another over the links 120. The nodes 110 can be network elements such as switches, routers, cross-connects, add/drop multiplexers, etc. which include a plurality of ingress and egress ports communicatively coupled directly or via mapping/multiplexing over the links 120. An exemplary node 110A is illustrated in FIG. 2. The network 100 is illustrated with the nodes 110 in an interconnected mesh topology for illustration purposes. Those of ordinary skill in the art will recognize that the network 100 can include more or less nodes 110 and various topologies. The network 100 can include a control plane 130 operating on and/or between the nodes 110a, 110b, 110c, 110d, 110e. The control plane 130 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. The links 120 can include bandwidth at various layers such as optical capacity (e.g., wavelengths), time division multiplexing capacity (e.g., SONET, SDH, OTN, etc.), and packet capacity (e.g., Ethernet, MPLS, Internet Protocol (IP), etc.). In an exemplary embodiment, the control plane 130 can utilize various constraint-based routing protocols at any of the various layers such as, without limitation, Constrained Shortest Path First (CSPF), Constraint-based Routing Label Distribution Protocol (CR-LDP), Resource Reservation Protocol-Traffic Engineering (RSVP-TE), Private Network-to-Network Interface (PNNI), Open Shortest Path First (OSPF), OSPF-Traffic Engineering (OSPF-TE), Intermediate System to Intermediate System (IS-IS), and the like.

The path computed using CSPF is a shortest path fulfilling a set of constraints. It simply means that it runs shortest path algorithm after pruning those links that violate a given set of constraints. CR-LDP is an extension of LDP in MPLS to set up a Label Switched Path (LSP) based on explicit route constraints, quality of service constraints, and other constraints. For example, CR-LDP is described in RFC 3472, "Generalized Multi-Protocol Label Switching (GMPLS), Signaling Constraint-based Routed Label Distribution Protocol (CR-LDP) Extensions," (January 2003), the contents of which are incorporated by reference herein. RSVP-TE is an extension of the resource reservation protocol (RSVP) for traffic engineering. RSVP-TE is detailed in IETF RFC 3209, "RSVP-TE: Extensions to RSVP for LSP Tunnels," (December 2001), and updated by RFC 5151, "Inter-Domain MPLS and GMPLS Traffic Engineering—Resource Reservation Protocol-Traffic Engineering (RSVP-TE) Extensions," (February 2008), the contents of each are incorporated by reference herein. RSVP-TE is also detailed in ITU Recommendation G.7713.2/Y.1704.2 (03/03), "Distributed Call and Connection Management: Signaling mechanism using GMPLS RSVP-TE," the contents of which are incorporated by reference herein. RSVP-TE generally allows the establishment of LSPs, taking into consideration network constraint parameters such as available bandwidth and explicit hops. OSPF is a link-state routing protocol that computes a shortest path tree for each route using a method based on Dijkstra's algorithm that considers OSPF routing policies which are governed by link cost factors.

OSPF is described, for example, in RFC 2328, "OSPF Version 2," (April 1998) and RFC 5340, "OSPF for IPv6," (July 2008), the contents of each are incorporated by reference herein. OSPF-TE is an extension to OSPF extending the expressivity to allow for traffic engineering and use on non-IP networks, and is described in RFC 3630, "Traffic Engineering (TE) Extensions to OSPF Version 2," (September 2003), the contents of which are incorporated by reference herein. IS-IS is similar to OSPF but includes type-length-value (TLV) data to enable easy expansion without redesigning the protocol. IS-IS is described, for example, in RFC 1142, "OSI IS-IS Intra-domain Routing Protocol," (February 1990), the contents of which are incorporated herein. The opportunity-based path computation systems and methods contemplate operation with any constraint-based routing algorithm such as the aforementioned techniques. Those of ordinary skill in the art will recognize the network 100 and the control plane 130 can utilize any type control plane for controlling the nodes 110 and establishing connections therebetween along with any constraint-based routing algorithm.

Referring to FIG. 2, in an exemplary embodiment, a block diagram illustrates an exemplary node 110A for use with the systems and methods described herein. In an exemplary embodiment, the exemplary node 110A can be a network element that may consolidate the functionality of a multi-service provisioning platform (MSPP), digital cross connect (DCS), Ethernet switch, Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 110A can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, an Ethernet switch, an IP router (e.g., core or edge), etc. That is, the node 110A can be any digital system with ingress and egress digital signals and switching therebetween of wavelengths, channels, timeslots, tributary units, packets, etc. While the node 110A is generally shown as an optical network element in terms of ingress and egress ports, the systems and methods contemplated for use with any switching fabric, network element, or network based thereon.

In an exemplary embodiment, the node 110A includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a PCE, SDN controller, OpenFlow controller, etc.). The management system 250 can include a network management system (NMS), element management system (EMS), or the like. Additionally, the common equipment 210 can include a control plane processor, such as a controller 300 illustrated in FIG. 3, configured to operate the control plane 130 as described herein. The node 110A can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 120 to/from the node 110A. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links 120. From a logical perspective, the line modules 220 provide ingress and egress ports to the node 110A, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; IP routing; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the node 110A can include other components which are omitted for illustration purposes, and that the systems and methods described herein are contemplated for use with a plurality of different network elements with the node 110A presented as an exemplary type of network element. For example, in another exemplary embodiment, the node 110A may not include the switch modules 230, but rather have the corresponding functionality in the line modules 220 (or some equivalent) in a distributed fashion. For the node 110A, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane 130. Furthermore, the node 110A is merely presented as one exemplary node 110A for the systems and methods described herein.

Figure 3:
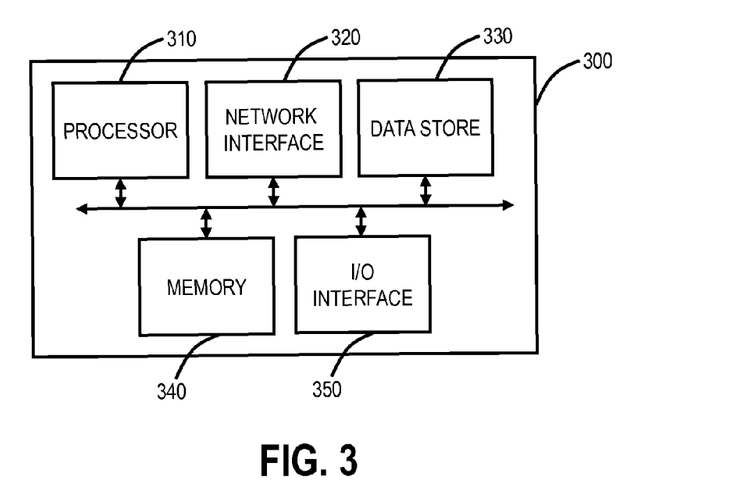
FIG. 3 is a block diagram of a controller to provide control plane processing and/or operations, administration, maintenance, and provisioning (OAM&P) for the node of FIG. 2.

Referring to FIG. 3, in an exemplary embodiment, a block diagram illustrates a controller 300 to provide control plane processing and/or operations, administration, maintenance, and provisioning (OAM&P) for the node 110A. The controller 300 can be part of common equipment, such as common equipment 210 in the node 110A, or a stand-alone device communicatively coupled to the node 110A via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an I/O interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 100 to operate the control plane 130 for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. For Ethernet, MPLS, or IP networks, the control plane signaling can be in-band, i.e., carried with data packets as well as being a separate tunnel, instance, etc. Other mechanisms are also contemplated for control plane signaling.

The controller 300 is configured to operate the control plane 130 in the network 100. That is, the controller 300 is configured to implement software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; path computation and creation for connections; network level protection and restoration; and the like. As part of these functions, the controller 300 can include a topology database that maintains the current topology of the network 100 based on control plane signaling (e.g., HELLO messages) and a connection database that maintains available bandwidth on the links 120 again based on the control plane signaling. Again, the control plane 130 is a distributed control plane; thus a plurality of the controllers 300 can act together to operate the control plane 130 using the control plane signaling to maintain database synchronization. In source-based routing, the controller 300 at a source node for a connection is responsible for path computation and establishing by signaling other controllers 300 in the network 100. For example, the source node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links 120 through the nodes 110 from the source node to the destination node based on a plurality of constraints such as administrative weights on the links 120, bandwidth availability on the links 120, etc.

In various examples described herein, the opportunity-based path computation systems and methods are described with reference to OTN or Ethernet services for illustration purposes only. Those of ordinary skill in the art will recognize that the opportunity-based path computation systems and methods can be used with other protocols such as, without limitation, SONET, SDH, Ethernet, MPLS, IP, etc. That is, opportunity cost can be used in any protocol using constraint-based routing.

Figure 4:
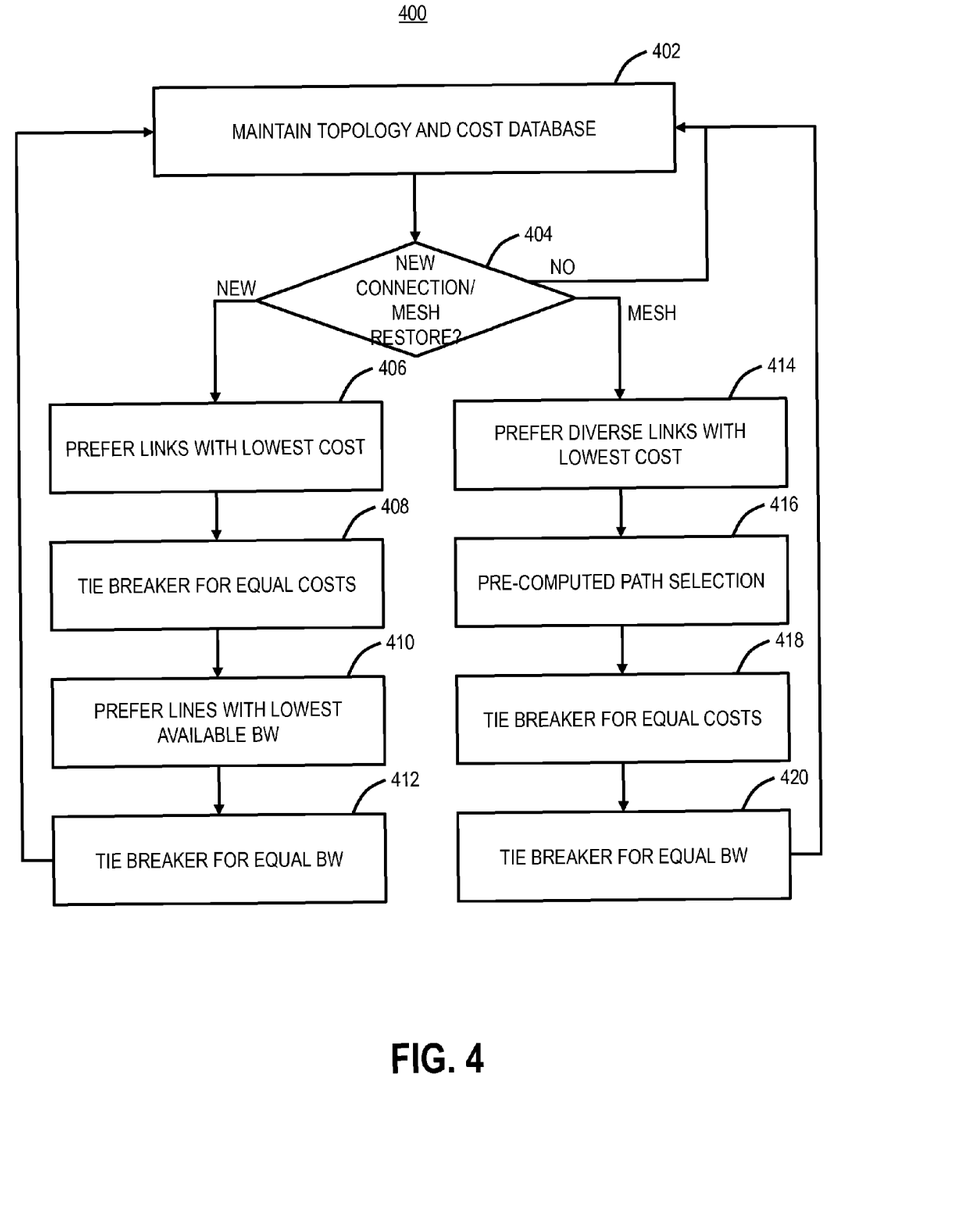
FIG. 4 is a flowchart of a constraint-based routing method.

Referring to FIG. 4, in an exemplary embodiment, a flowchart illustrates a constraint-based routing method 400. The constraint-based routing method 400 can be utilized to set up connections in the network 100 by both determining which of the links 120 to utilize as well as lines on the links 120. Lines can include bandwidth containers such as OTN-based. The constraint-based routing method 400 includes maintaining a topology and cost database (step 402). The control plane 130 includes control plane signaling which ensures topology and cost updates are distributed and maintained in an up-to-date manner at all of the nodes 110. As such, each of the nodes 110 and associated controllers will have an up-to-date network view including the topology of the network 100, costs for each of the links 120, and bandwidth on each of the links 120. The constraint-based routing method 400 can used to establish new connections and/or to perform mesh restoration (step 404).

For a new connection (step 404), the constraint-based routing method 400 can prefer links with a lowest cost (step 406), use a tie breaker for links with equal costs (step 408), prefer lines on the links with a lowest amount of available bandwidth (BW) (step 410), and use a tie break for lines with equal bandwidth (step 412). The lowest cost can be based on a plurality of factors. For example, cost can be expressed as an administrative weight per link which can be weighted based on length, delay, etc. In the opportunity-based path computation systems and methods, opportunity cost is added as one of the factors as is described herein. For the tie breaker for links with equal costs, any arbitrary distinction can be used such as link ID and choosing the link with a lowest ID. Preferring lines on the links with the lowest amount of available bandwidth prevents fragmentation of bandwidth, i.e., it is best to select a link which has just enough bandwidth to support the connection than to select a link with more bandwidth so fragmentation is avoided.

For restoration (step 404), the constraint-based routing method 400 can prefer diverse links with a lowest cost (step 414), select a pre-computed path for high priority connections (step 416), use a tie breaker for links with equal costs (step 418), prefer lines on the links with a lowest amount of available bandwidth (BW) and use a tie break for lines with equal bandwidth (step 420). The restoration is performed on connections affected by a fault. The pre-computed path selection (high priority connection definition) can be based on randomization to avoid over-subscription of bandwidth by multiple connections in their protect routes if cost (admin weight/latency) is same. For restoration other than pre-computed paths, a lowest link ID can be preferred if cost (admin weight/latency) is same. If multiple lines in an aggregated link has the same cost and lowest bandwidth available, a lowest common ID can be used.

Based on the constraint-based routing method 400 with OTN, conventional behavior is described as follows, i.e., without using an opportunity cost. First, consider Optical channel Data Unit-Flex (ODUflex) connections, ODUflex-based connections support a dynamic growth of connections. In the constraint-based routing method 400, available bandwidth would be on basis of current consumption of bandwidth for an ODUflex connection. Without considering opportunity cost, future connections of different sizes may exhaust growth opportunity on a link when it could have chosen different link, having equivalent bandwidth. For example, assume there are two 100 G OTN links available with following characteristics:

| Existing Connections | Link1 (Optical channel Transport Unit-4 (OTU4) physical port/line | Link2 (OTU4) physical port/line |
|---|---|---|
| ODUflex | 20 Gbps (16 ODU4 tributary slots) which can grows up to 40 Gbps (32 ODU4 tributary slots) based on provisioning | |
| ODU3 | 40 Gbps | 40 Gbps |
| ODU2 | 0 Gbps | 20 Gbps |
| Total | 60 Gbps | 60 Gbps |

Now from path computation perspective for a new ODU3 connection, both the links could support 40 Gbps and have equal amount of bandwidth available (resulting in equal fragmentation cost). If the constraint-based routing method 400 does not distinguish between link1 and link2 based on opportunity, one may end up exhausting link1, i.e., with the future opportunity for the ODUflex to grow, when one could have selected link2 and avoided the situation.

With respect to opportunity based on capability, some links may support more bandwidth rate support than others, thus offering more capability, but conventional path computation logic does not differ between these if available bandwidth is same on both the links. In another example, assume there are two 100 Gbps OTN links available with following:

| Existing Connections | Link1 (OTU4) | Link2 (OTU4) | Link3 (OTU2) |
|---|---|---|---|
| ODU2 | 8 connections so only ODU2/ODU2E/ODU1/ODU0 connections could get created | 9 connections so only ODU2/ODU2E/ODU1/ODU0 connections could get created | 0 connections so ODU2//ODU1/ODU0 connections could get created |

Now from path computation perspective for ODU0/ODU1/ODU2 connections, current algorithm may treat these links on same weightage and may end up selecting link1 or link2. This may exhaust ODU2E future opportunity, when it could had been avoided by selecting alternate links (like link3).

In various exemplary embodiments, the opportunity-based path computation systems and methods enhance constraint-based routing algorithms by adding opportunity cost as a new metric providing a constraint and opportunity-based routing algorithm. By accounting for future opportunity a particular link offers and selecting the path that offers least future opportunity for others, the opportunity-based path computation systems and methods ensures that other connections gets the most opportunities available. Specifically, the constraint-based routing method 400 or the like evaluates a cost metric associated with loss of future opportunity (namely the opportunity cost) for each of the available paths and chooses the one with the lowest opportunity cost among other constraints. Opportunity cost can be given higher precedence than delay cost. This means if multiple paths are compliant with a maximum specified delay, instead of selecting the path that offers the lowest delay, the path that offers lowest opportunity can be selected. This would result in better allocation of resources, since connections would try not to take away future opportunities from other connections.

This requires "Opportunity" information on per link basis to be published in routing database, so that each node have information regarding which local/remote link is offering which opportunity. For example, the constraint-based routing method 400 can include updates on opportunity costs for each link or the opportunity costs can be locally computed based on other information already provided in the updates. As a general proposition, an opportunity cost differentiates links based on which ones could grow with respect to existing connections versus links which could grow less or not at all as well as those which have different capabilities to support diversity of connection types. The objective is to bias link selection for new connections to ones that have lower opportunities. For example, opportunity costs, for OTN connections, can be based on the presence or absence and type of ODUflex connections on a link. For packet connections, opportunity costs can be based on an amount of Extended Information Rate (EIR) on a link. Other types of opportunity costs are also contemplated. Whether an opportunity needs to be flagged or not would be decided by each link locally, based on various factors such as (but not limited to) dynamic bandwidth arrangement, growth demand, capability, and the like.

Opportunity Costs for ODUflex-Based Connections

For links with ODUflex-based connections, each link advertises opportunity information with respect to flex growth cost for each bandwidth size. Links that have lower opportunity cost could be chosen over link that have higher opportunity cost. The opportunity cost on a link corresponding to flex connections would be based on current available bandwidth, and future demand. In an exemplary embodiment, the opportunity cost for ODUflex connections can be expressed as a flag or as a number of ODUflex connections already on the like (as well as a number for each different type). The goal would be to select the link with the lowest opportunity. For example, using the Link1 and Link2 example from above:

| Existing Connections | Link1 (Optical channel Transport Unit-4 (OTU4) physical port/line | Link2 (OTU4) physical port/line |
|---|---|---|
| ODUflex | 20 Gbps (16 ODU4 tributary slots) which can grows up to 40 Gbps (32 ODU4 tributary slots) based on provisioning | |
| ODU3 | 40 Gbps | 40 Gbps |
| ODU2 | 0 Gbps | 20 Gbps |
| Total | 60 Gbps | 60 Gbps |

Again, from a path computation perspective for an ODU3 connection, both the links could support 40 G and have equal amount of bandwidth available. In an exemplary embodiment, the Link1 can advertise the following opportunity costs:

| | |
|---|---|
| OpportunityFlexCostOdu0 | 0 |
| OpportunityFlexCostOdu1 | 0 |
| OpportunityFlexCostOdu2 | 0 |
| OpportunityFlexCostOdu2E | 0 |
| OpportunityFlexCostOdu3 | 1 |
| OpportunityFlexCostOdu4 | Don't Care |

Link2 can advertise the following opportunity costs:

| | |
|---|---|
| OpportunityFlexCostOdu0 | 0 |
| OpportunityFlexCostOdu1 | 0 |
| OpportunityFlexCostOdu2 | 0 |
| OpportunityFlexCostOdu2E | 0 |
| OpportunityFlexCostOdu3 | 0 |
| OpportunityFlexCostOdu4 | Don't Care |

Note, the Flex Cost for ODU4 is any value since the link supports only one ODU4 and the presence of an ODU4 would make the link unavailable anyway. Now, in the constraint-based routing method 400, the opportunity cost provides another way to differentiate the links. Now, a new ODU3 connection would select the Link2 over the Link1 since Link2 has a lower opportunity cost.

The opportunity cost information could be used by a Path Computation Engine to make decision of choosing paths that offers least opportunity (i.e., lowest opportunity cost) with respect to future other connection needs. In the above example, if a new connection request comes for ODU3 connection, Link2 would be chosen over Link1, keeping Link1 available for future growth. This would increase probability of keeping resources that offer most opportunity available for connections that need them. Once Link2 is exhausted, Link1 would be used, thus not impacting current availability of link but offering prolong availability of a choice. Also in above example for connection sizes of ODU0, ODU1, ODU2, ODU2E, both the links would be treated same with respect to opportunity cost, as both are advertising same opportunity cost.

Opportunity Cost Based on Capability

Again, some links may include more bandwidth rate support than others, thus offering more capability. To highlight these distinctions, each link can advertise opportunity information with respect to capability cost for each bandwidth size. Links that lower opportunity cost would be chosen over link that have higher opportunity cost. An opportunity cost bit could be set true for those connection sizes which may be threaten based on current opportunity on the link. Again, from an example above, assume there are three links available with following characteristics:

| Existing Connections | Link1 (OTU4) | Link2 (OTU4) | Link3 (OTU2) |
|---|---|---|---|
| ODU2 | 8 connections so only ODU2/ODU2E/ODU1/ODU0 connections could get created | 9 connections so only ODU2/ODU2E/ODU1/ODU0 connections could get created | 0 connections so ODU2//ODU1/ODU0 connections could get created |

Assume a new connection is an ODU2E, creating an ODU0/ODU1/ODU2 on Link1 would not be threat for ODU2E connections, so as per this option there is no preferred behavior required with respect to ODU2E opportunity, as ODU2E connections would still get created. So for option1, link1 would be having following flags set:

| OpportunityOdu2ECapabilityCostOdu0 | 0 |
| OpportunityOdu2ECapabilityCostOdu1 | 0 |
| OpportunityOdu2ECapabilityCostOdu2 | 0 |
| OpportunityOdu2ECapabilityCostOdu2E | Don't Care |

To elaborate, the flag 'OpportunityOdu2ECapabilityCostOdu0' signifies whether there is opportunity cost (i.e., opportunity may get lost if this link is selected) of ODU2E opportunity if someone tries to create an ODU0 connection. Similarly, the flag 'OpportunityOdu2ECapabilityCostOdu1' signifies whether there is opportunity cost (i.e., opportunity may get lost if this link is selected) of ODU2E opportunity if someone tries to create an ODU1 connection. There can also be flags for ODU0, ODU1, ODU2, etc.

As per this option, but in the case of Link2, creating an ODU0/ODU1/ODU2 on Link2 would be threat for ODU2E connections, as ODU2E connections would not get created anymore. However if one chooses other links, e.g., Link1 or Link3 for ODU0/ODU1/ODU2 connections, these links can still be used for ODU2E connection. So as per this option there is a preferred behavior required with respect to ODU2E opportunity. For ODU2E, Link2 would be having following flags set:

| OpportunityOdu2ECapabilityCostOdu0 | 1 |
| OpportunityOdu2ECapabilityCostOdu1 | 1 |
| OpportunityOdu2ECapabilityCostOdu2 | 1 |
| OpportunityOdu2ECapabilityCostOdu2E | Don't Care |

Link3 is not capable of supporting an ODU2E connection (i.e., OTU2 links do not support ODU2E connections). Link3 would having following flags set:

| OpportunityOdu2ECapabilityCostOdu0 | 0 |
| OpportunityOdu2ECapabilityCostOdu1 | 0 |
| OpportunityOdu2ECapabilityCostOdu2 | 0 |
| OpportunityOdu2ECapabilityCostOdu2E | Don't Care |

Now from a path computation perspective for ODU0/ODU1/ODU2 connections, Link1/Link3 would be preferred compared to Link2 as choosing it would be less costly with respect to opportunity cost.

Note, opportunity cost-based constraint is different from 'fragmentation cost' being used as constraint, as fragmentation cost distinguishes on the basis of current resources (available bandwidth and maximum bandwidth). While capability-based opportunity cost distinguishes on the basis of future opportunities link is offering (capability link can support). Also fragmentation logic does not consider future growth opportunity flex connections may have. In the case of an aggregated link, the line offering least opportunity would be the one that would be selected.

Opportunity Cost—Packet-based networks

The opportunity-based path computation systems and methods can also be used in constraint-based routing algorithms for Layer 2 and Layer 3 connections. For example, at Layer 2, existing connections can be defined in part with a Committed Information Rate (CIR)/Committed Burst Size (CBS) and an Excess Information Rate (EIR)/Excess Burst Size (EBS). Note, in the aforementioned description relative to OTN, the constraint-based routing method 400 is described in granular bandwidth chunks (which is typical at Layer 1) to compute the constraints for future growth costs or capabilities. At Layer 2 and Layer 3, the bandwidth would not be in chunks, but variable.

Exemplary Layer 2 connections can include Metro Ethernet Forum (MEF) defined E-LINE, E-LAN, or E-TREE connections. If there are wide variances between CIR/CBS and EIR/EBS, it could mean that these circuits are potentially bursty and may have potential growth traffic in excess of steady state traffic. For example, a static bandwidth formula can be used by a routing/CAC component to compute the bandwidth requirement of a L2 circuit, given the CIR/CBS and EIR/EBS. A simple variance/standard deviation formula can be used to exclude links where aggregate variance/deviation of EIR/EBS from CIR/CBS is high, thereby allowing traffic flow on those links to grow freely, in excess of committed rates, i.e., setting the opportunity cost flags on these links to bias against selection to allow the excess traffic.

There are other characteristics of packet networks that can be used as opportunity costs for constraint-based routing algorithms. For example, the maximum transmission unit (MTU) is the size in bytes that the largest protocol data unit (PDU) that the layer can pass onwards. For example, Ethernet can fix the size of an MTU. The MTU and/or other characteristics can be used for opportunity costs. For example, this aspect could be used to prioritize between differently-abled links and choose the one with the least capability (e.g., lowest MTU among links which can support the circuit being routed), and therefore lowest capability cost.

General L1 and/or L2 Path Computation Method Using Opportunity Cost Constraint

Figure 5:
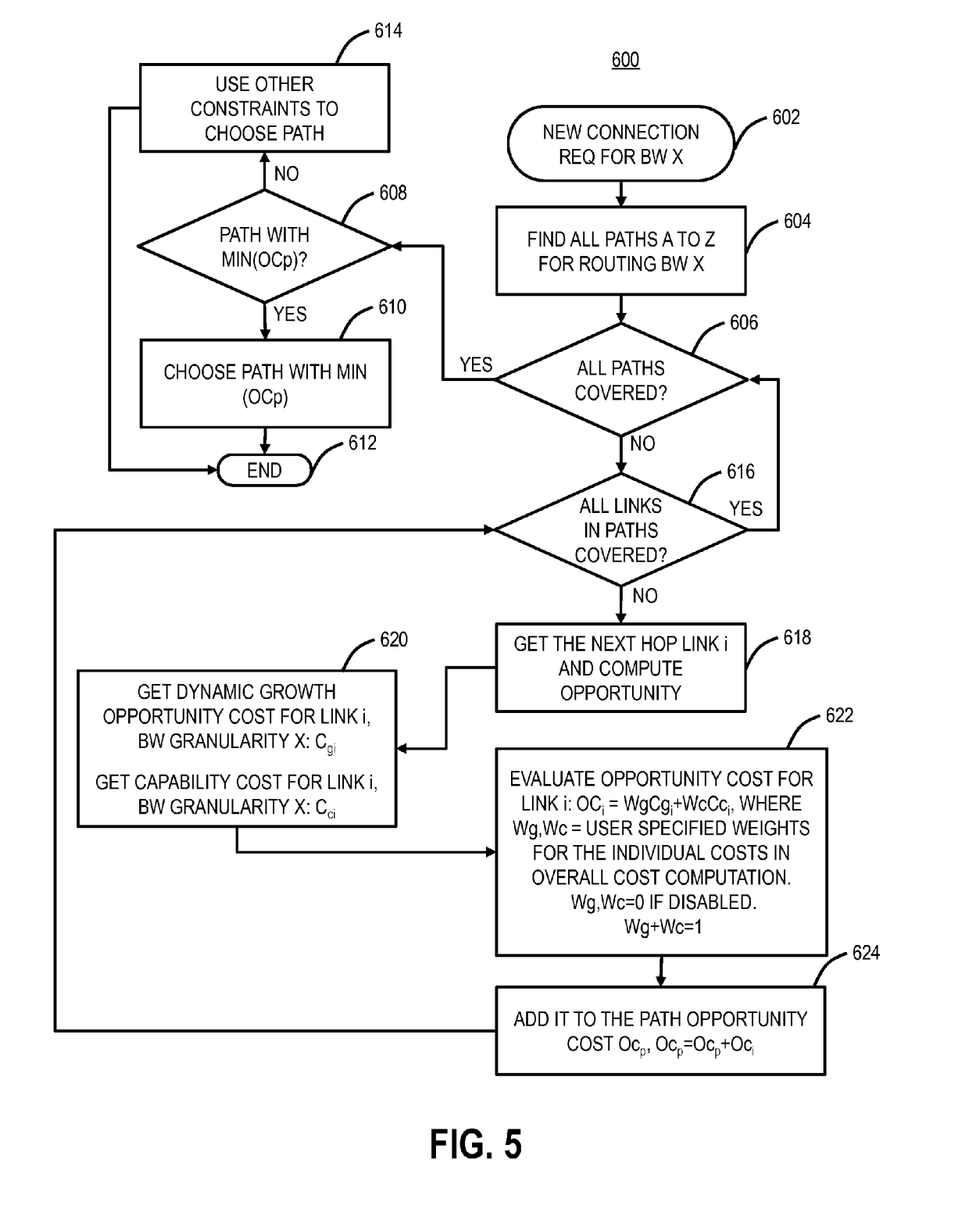
FIG. 5 is a flowchart of a general L1 and/or L2 Path computation method with minimum opportunity cost constraint applied.

Referring to FIG. 5, in an exemplary embodiment, a flowchart illustrates a general L1 and/or L2 Path Computation method using opportunity cost constraint 600. The opportunity constraint method 600 can be implemented in the network 100 such as at one of the nodes 110 via the controller 300 or in the PCE. Other implementations are also contemplated. The opportunity cost calculation method 600 is a general method for computation of opportunity cost using a weighted sum of growth and capability opportunities. This is generically applicable to L1 and L2 networks. The opportunity constraint based path computation method 600 assumes that opportunity cost is a first constraint and delay, admin weight, etc. are used as tie breakers. The opportunity cost calculation method 600 begins when there is a new connection request for routing a connection with bandwidth X from nodes A to Z (step 602). The opportunity cost calculation method 600 finds all paths A to Z for routing the connection with bandwidth X (step 604). This can be based on any path determination technique such as shortest path first (SPF), etc. Note, the path determination technique can also utilize constraints, e.g., maximum delay, maximum number of hops, etc. However, this path determination technique does not take into account opportunity cost. Rather, the path determination technique is determining all available paths (which can be constrained).

The opportunity constraint based path computation method 600 next checks if all the computed paths are covered from the perspective of having opportunity costs (step 606). If so, the opportunity cost calculation method 600 checks if there is a computed path with a minimum opportunity cost, MIN(OCp) (step 608). If so, the opportunity cost calculation method 600 can select the path with the MIN(OCp) (step 610) and end (step 612). If not, the opportunity constraint based path computation method 600 can use other constraints to choose the path from among several paths that have the same opportunity costs (step 614). For example, the opportunity constraint based path computation method 600 can use admin weight, delay, etc. If all the computed paths are not covered from the perspective of having opportunity costs (step 606), the opportunity constraint based path computation method 600 will compute or determine the opportunity costs for all the paths that need it. Taking a selected path, the opportunity constraint based path computation method 600 checks if all links in the path are covered from the perspective of having opportunity costs (step 616), and if so, the opportunity constraint based path computation method 600 returns to the step 606 (and selects another path). If not, the opportunity constraint based path computation method 600 gets the next hop, Link i, and computes its opportunity cost (step 618).

The opportunity constraint based path computation method 600 gets the Dynamic Growth Opportunity Cost for link i, BW granularity X: $C_{gi}$ and gets the Capability Cost for link i, BW granularity X: $C_{ci}$ (step 620). The Dynamic Growth Opportunity Cost and the Capability Cost can be taken from a routing database that is maintained with the latest updates. The opportunity constraint based path computation method 600 evaluate Opportunity cost for link i: $OC_i = W_g C_{gi} + W_c C_{ci}$, where $W_g$, $W_c$=User specified Weights for the individual costs in overall cost computation, $W_g$, $W_c$=0 if disabled; otherwise $W_g + W_c = 1$ (step 622). The weights allow a user to weight growth or capability more.

Next, the opportunity constraint based path computation method 600 adds $OC_i$ to an overall path opportunity cost, $Oc_p$, $Oc_p = Oc_p + Oc_i$ (step 624), and the opportunity constraint based path computation method 600 returns to the step 616. Once all links are computed in the path p, the path p will have the overall path opportunity cost, $Oc_p$.

Growth Opportunity Cost Calculation Method

Figure 6:
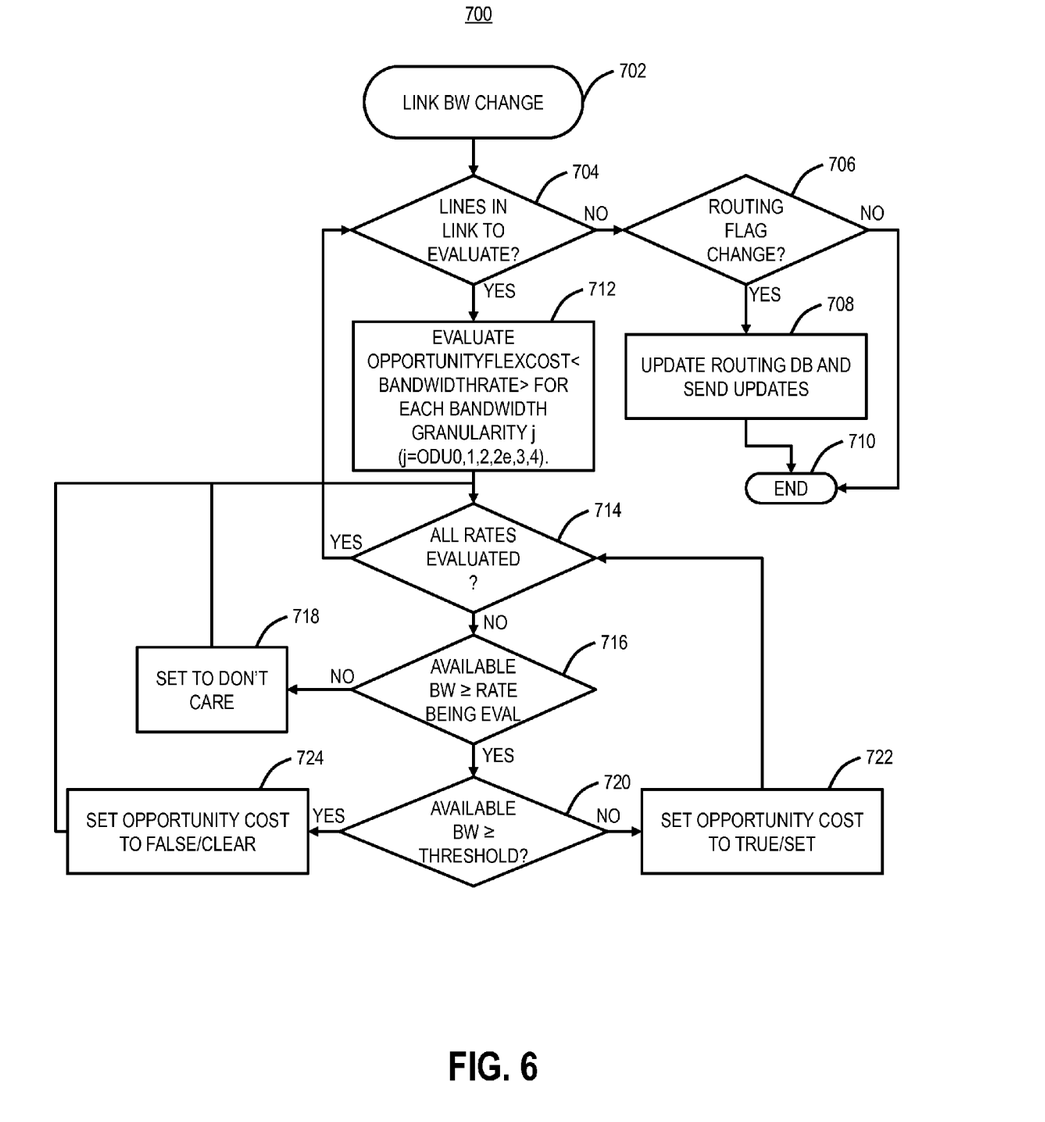
FIG. 6 is a flowchart illustrates a growth opportunity cost calculation method for L1 (OTN) networks.

Referring to FIG. 6, in an exemplary embodiment, a flowchart illustrates a growth opportunity cost calculation method 700 for L1 (OTN) networks. The growth opportunity cost calculation method 700 can be implemented in the network 100 such as at one of the nodes 110 via the controller 300 or in the PCE. Other implementations are also contemplated. The growth opportunity cost calculation method 700 begins when a link bandwidth changes, e.g., based on addition/deletion/creation/modification of a connection on the link (step 702). The growth opportunity cost calculation method 700 checks if there are more lines in the link to evaluate with respect to the change (step 704), and if not, the growth opportunity cost calculation method 700 checks if there were any routing opportunity flags changed (step 706). If so, the growth opportunity cost calculation method 700 updates a routing database and sends updates to other nodes in the network (step 708), and ends (step 710), and if not, the growth opportunity cost calculation method 700 ends (step 710).

If there are more lines in the link to evaluate with respect to the change (step 704), the growth opportunity cost calculation method 700 evaluates for a selected line an OpportunityFlexCost<BandwidthRate> for each bandwidth granularity j (j=ODU0, 1, 2, 2e, 3, 4, etc.) (step 712). If all rates are evaluated (step 714), the growth opportunity cost calculation method 700 returns to the step 704. If not, the growth opportunity cost calculation method 700 selects a particular bandwidth rate to evaluate and checks if the available bandwidth is greater than or equal to the particular bandwidth rate (step 716). If not, the link cannot support the particular bandwidth rate, so the OpportunityFlexCost<BandwidthRate> for the particular bandwidth rate is set to "don't care" (step 718).

If the available bandwidth is greater than or equal to the particular bandwidth rate (step 716), the growth opportunity cost calculation method 700 checks if the available bandwidth is above a threshold (step 720). For example, the threshold can be the Particular Bandwidth Rate being evaluated+ Total communicated (in signaling while connection establishment) future demand for existing flex connections. If the available bandwidth is greater than or equal to the particular bandwidth rate (step 716), the growth opportunity cost calculation method 700 sets OpportunityFlexCost<BandwidthRate j> for bandwidth rate being evaluated as TRUE/SET i.e. 1 (step 722), otherwise the growth opportunity cost calculation method 700 sets OpportunityFlexCost<BandwidthRate j> as FALSE/CLEAR i.e. 0 (step 724), and the growth opportunity cost calculation method 700 returns to step 714.

L1 Capability Cost Calculation for Method

Figure 7:
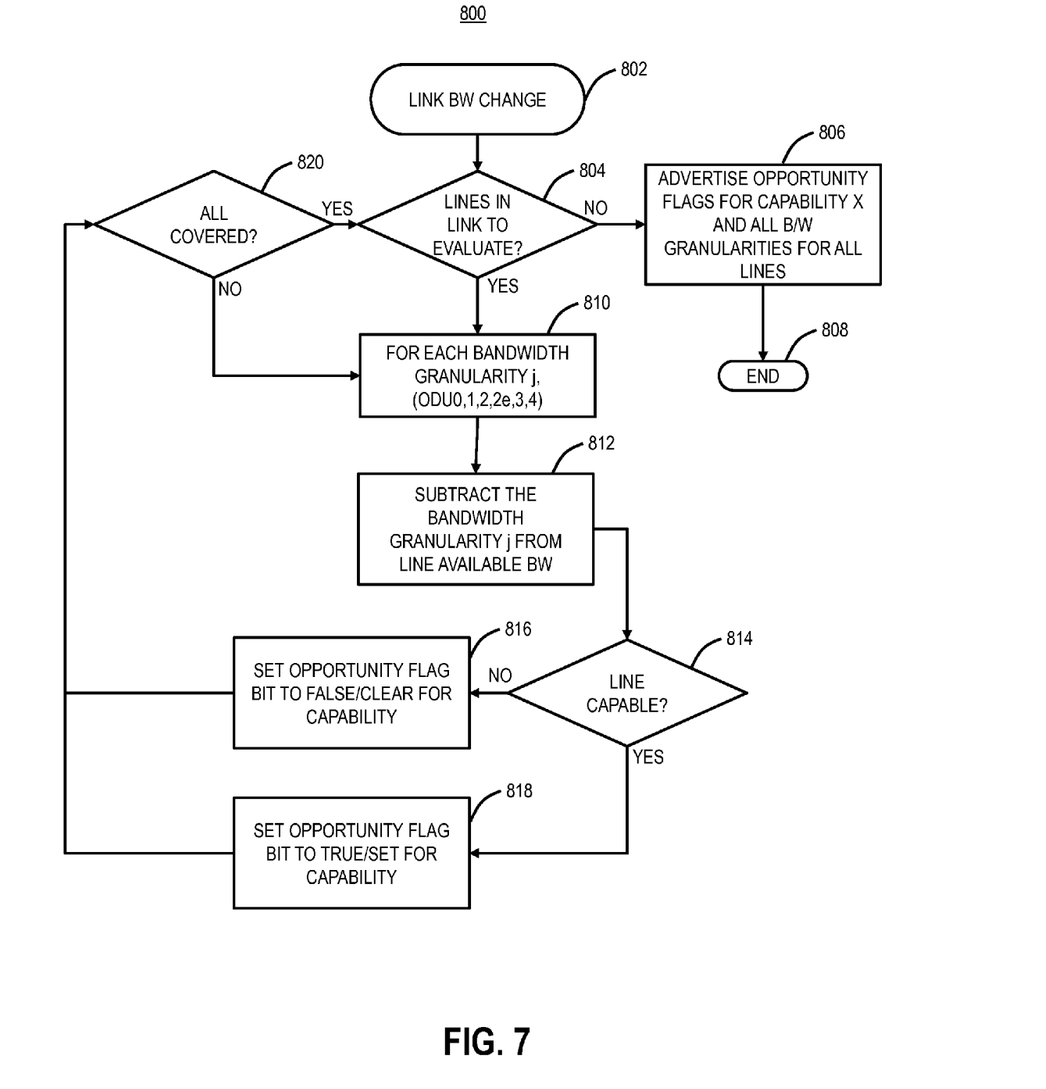
FIG. 7 a flowchart illustrates a capability cost calculation method for L1 (OTN) networks.

Referring to FIG. 7, in an exemplary embodiment, a flowchart illustrates a capability cost calculation method 800 for L1 (OTN) networks. The capability cost calculation method 800 can be implemented in the network 100 such as at one of the nodes 110 via the controller 300 or in the PCE. Other implementations are also contemplated. The capability cost calculation method 800 begins when a link bandwidth changes, e.g., based on addition/deletion/creation/modification of a connection on the link (step 802). The capability cost calculation method 800 checks if there are more lines in the link to evaluate with respect to the change (step 784), and if not, the capability cost calculation method 800 advertises opportunity flags for capability X and all BW granularities for all lines (step 806) and ends (step 808).

If there are more lines in the link to evaluate with respect to the change (step 804), the capability cost calculation method 800 evaluates, for a selected line, each bandwidth granularity j (ODU0, ODU1, OD2, ODU2e, ODU3, ODU4, etc.) (step 810). The capability cost calculation method 800 subtracts the bandwidth granularity j from the line available bandwidth (step 812), and checks if the line is capable of handling the bandwidth granularity j (step 814). If not, the capability cost calculation method 800 sets an Opportunity flag bit for capability X and BW granularity j as false, since there is no opportunity on this link to support connection capability (step 816). If so, the capability cost calculation method 800 sets the Opportunity flag bit for capability as true, since there is opportunity on this link to support connection capability (step 818). The capability cost calculation method 800 checks if all bandwidth granularities are covered (step 820), and if so, returns to step 804, and if not, returns to step 810. The capability cost calculation method 800 is again specific to OTN and for packet networks, it would be a simple metric based on lowest MTU=lower capability, constraint could be choose the link with the minimum MTU of all available links having MTU which can at least support the connection requirement.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
 determining an opportunity cost metric for each of a plurality of links in a network comprising a plurality of nodes, wherein the opportunity cost metric comprises a future constraint reflecting expectations for growth on currently established connections on each link of the plurality of links;
 receiving a request for a new connection between two nodes of the plurality of nodes in the network; and
 utilizing a constraint-based routing algorithm to determine a path for the new connection between the two nodes, wherein the constraint-based routing algorithm determines the path through the plurality of nodes via the plurality of links based on a plurality of constraints comprising the opportunity cost metric.

2. The method of claim 1, wherein the opportunity cost metric comprises a flag identifying a presence or absence of expandable connections of the currently established connections on each link of the plurality of links.

3. The method of claim 2, wherein the opportunity cost metric is based on a presence or absence of flexible Optical channel Data Unit (ODU) connections on each link of the plurality of links.

4. The method of claim 1, wherein the opportunity cost metric comprises a numerical value identifying an amount of expandable connections for the currently established connections on each link of the plurality of links.

5. The method of claim 4, wherein the numerical value is based on a Committed Information Rate (CIR)/Committed Burst Size (CBS) and an Excess Information Rate (EIR)/Excess Burst Size (EBS) for the currently established connections on each link of the plurality of links.

6. The method of claim 1, wherein the opportunity cost metric is defined for each of a plurality of bandwidth chunks on each link of the plurality of links.

7. The method of claim 1, wherein the opportunity cost metric is defined for a capability of adding any of a plurality of bandwidth chunks on each link of the plurality of links.

8. The method of claim 1, further comprising:
 biasing the constraint-based routing algorithm to select links of the plurality of links based on a lower opportunity cost metric than other links of the plurality of links.

9. The method of claim 1, further comprising:
 for links of the plurality of links that comply with a maximum delay constraint, selecting the links based on the opportunity cost metric.

10. The method of claim 1, further comprising:
 publishing and maintaining the opportunity cost metric for each of the plurality of links via control plane signaling in the network.

11. The method of claim 1, wherein the constraint-based routing algorithm comprises any of Constrained Shortest Path First (CSPF), Constraint-based Routing Label Distribution Protocol (CR-LDP), Resource Reservation Protocol-Traffic Engineering (RSVP-TE), Private Network-to-Network Interface (PNNI), Open Shortest Path First (OSPF), OSPF-Traffic Engineering (OSPF-TE), and Intermediate System to Intermediate System (IS-IS).

12. A controller, comprising:
 a network interface communicatively coupled to one or more nodes of a plurality of nodes in a network;

a processor communicatively coupled to the network interface; and memory storing instructions that, when executed, cause the processor to:

receive or determine an opportunity cost metric for each of a plurality of links interconnecting the plurality of nodes, wherein the opportunity cost metric comprises a future constraint reflecting expectations for growth on currently established connections on each link of the plurality of links;

receive a request for a new connection between two nodes of the plurality of nodes in the network; and utilize a constraint-based routing algorithm to determine a path for the new connection between the two nodes, wherein the constraint-based routing algorithm determines the path through the plurality of nodes via the plurality of links based on a plurality of constraints comprising the opportunity cost metric.

13. The controller of claim 12, wherein the opportunity cost metric comprises a flag identifying a presence or absence of expandable connections of the currently established connections on each link of the plurality of links; and wherein the opportunity cost metric is based on a presence or absence of flexible Optical channel Data Unit (ODU) connections on each link of the plurality of links.

14. The controller of claim 12, wherein the opportunity cost metric comprises a numerical value identifying an amount of expandable connections for the currently established connections on each link of the plurality of links; and wherein the numerical value is based on a Committed Information Rate (CIR)/Committed Burst Size (CBS) and an Excess Information Rate (EIR)/Excess Burst Size (EBS) for the currently established connections on each link of the plurality of links.

15. The controller of claim 12, wherein the opportunity cost metric is one of defined for each of a plurality of bandwidth chunks on each link of the plurality of links and defined for a capability of adding any of a plurality of bandwidth chunks on each link of the plurality of links.

16. The controller of claim 12, wherein the instructions that, when executed, further cause the processor to:

bias the constraint-based routing algorithm to select links of the plurality of links based on a lower opportunity cost metric than other links of the plurality of links.

17. The controller of claim 12, wherein the instructions that, when executed, further cause the processor to:

for links of the plurality of links that comply with a maximum delay constraint, select the links based on the opportunity cost metric.

18. The controller of claim 12, wherein the instructions that, when executed, further cause the processor to:

maintain the opportunity cost metric for each of the plurality of links via control plane signaling in the network.

19. The controller of claim 12, wherein the constraint-based routing algorithm comprises any of Constrained Shortest Path First (CSPF), Constraint-based Routing Label Distribution Protocol (CR-LDP), Resource Reservation Protocol-Traffic Engineering (RSVP-TE), Private Network-to-Network Interface (PNNI), Open Shortest Path First (OSPF), OSPF-Traffic Engineering (OSPF-TE), and Intermediate System to Intermediate System (IS-IS).

20. A network, comprising:

a plurality of nodes interconnected by a plurality of links; and a control plane operating in the network and utilizing a constraint-based routing algorithm; wherein the control plane is configured to:

receive or determine an opportunity cost metric for each of the plurality of links, wherein the opportunity cost metric comprises a future constraint reflecting expectations for growth on currently established connections on each link of the plurality of links;

receive a request for a new connection between two nodes of the plurality of nodes in the network; and utilize the constraint-based routing algorithm to determine a path for the new connection between the two nodes, wherein the constraint-based routing algorithm determines the path through the plurality of nodes via the plurality of links based on a plurality of constraints comprising the opportunity cost metric.

* * * * *